Jan. 3, 1967  R. F. BASILE  3,296,365
FLAT CONDUCTOR CABLE JUMPER
Filed April 3, 1964 2 Sheets-Sheet 1
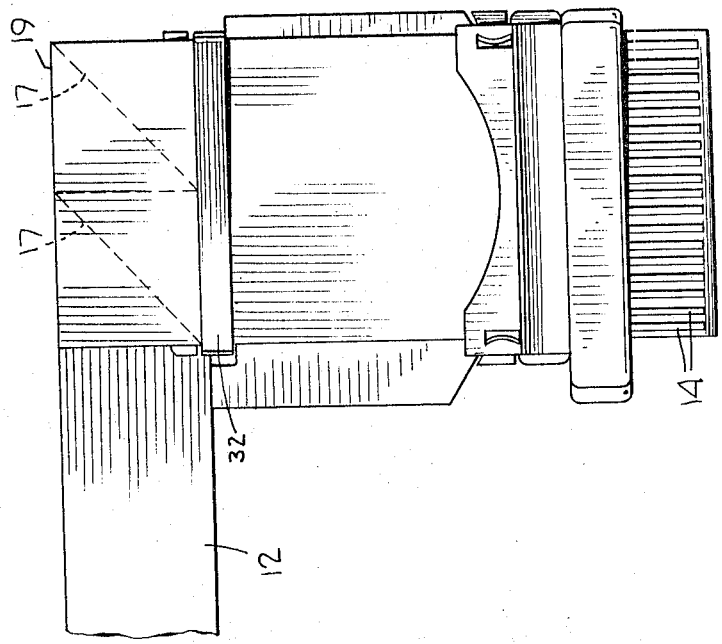
Fig. 1.
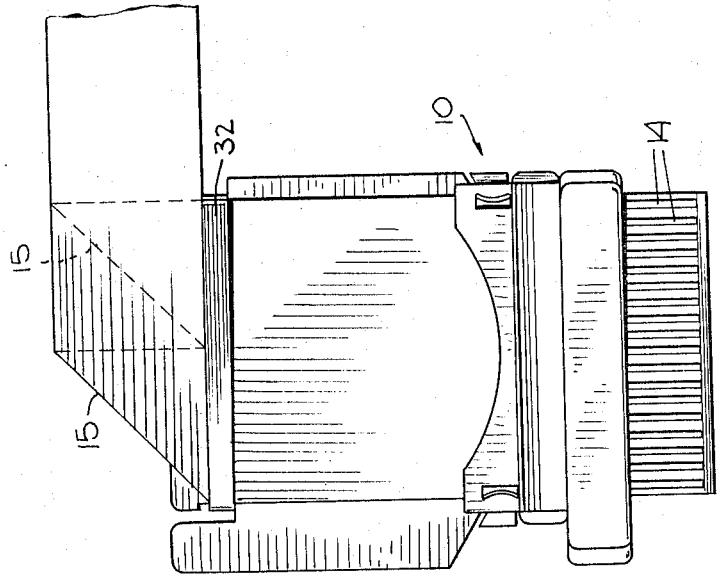
Fig. 2.
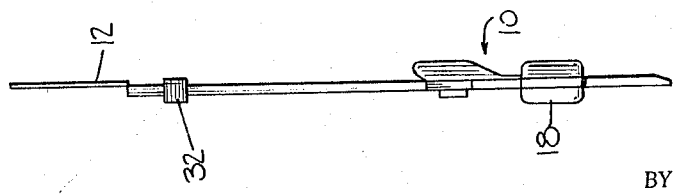
INVENTOR.
ROCCO F. BASILE
BY Kenyon & Kenyon
ATTORNEYS Jan. 3, 1967  R. F. BASILE  3,296,365
FLAT CONDUCTOR CABLE JUMPER
Filed April 3, 1964  2 Sheets-Sheet 2
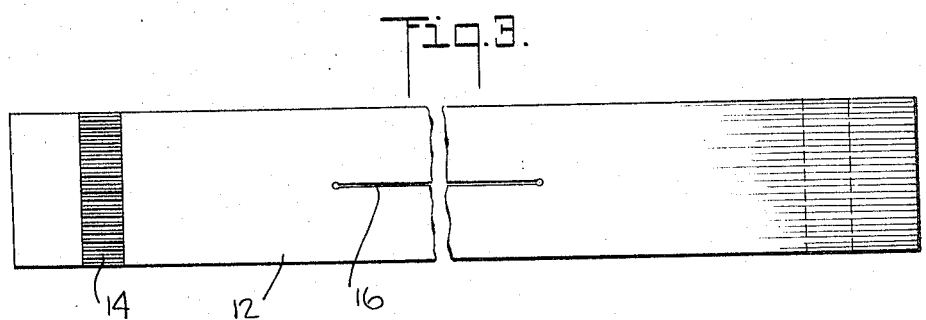
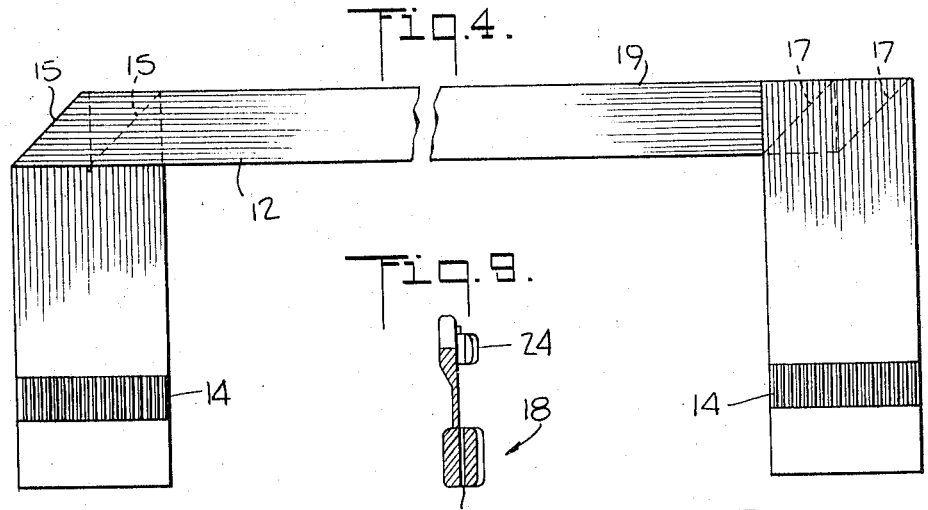
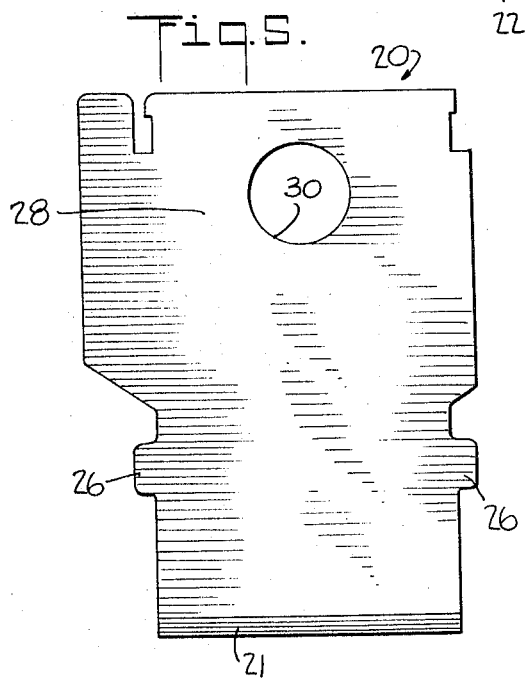
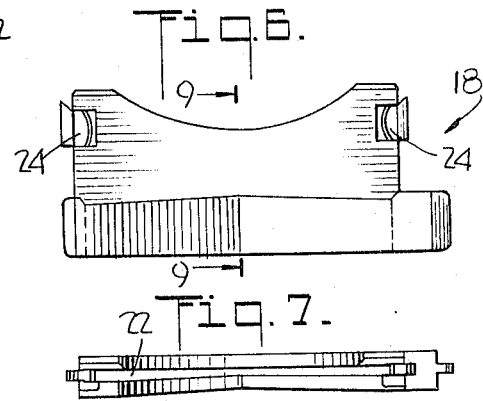
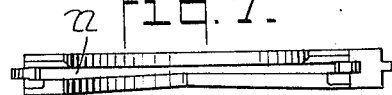
INVENTOR.
Rocco F. Basile
BY
Kenyon & Kenyon
ATTORNEYS

United States Patent Office 3,296,365
Patented Jan. 3, 1967

3,296,365
FLAT CONDUCTOR CABLE JUMPER
Rocco F. Basile, Roselle, N.J., assignor to The Thomas & Betts Co., Inc., Elizabeth, N.J., a corporation of New Jersey
Filed Apr. 3, 1964, Ser. No. 357,042
9 Claims. (Cl. 174—117)

This invention relates to a flat conductor cable jumper, and more particularly, to a specific form of flat conductor cable jumper, in which the width of the flat conductor cable is reduced substantially by the formation of a longitudinal slit and a series of transverse and 45 degree folds, whereby the reduction in total width of the flat cable enables the device of this invention to be used in restricted areas.

The flat cable conductor is a much more satisfactory device for use as a jumper member than are other devices currently employed. In many instances the device employed has been a multiple round wire cable having soldered to it connectors for each of the conductors. This is a complicated device to build and to service. More recently the industry has resorted to the use of flexible connections where interconnection of modules and computer components has been involved. This is because in certain instances flat conductor cable jumpers of the type heretofore used have been found to be too wide to pass through various openings in current equipment. The use of flexible etchings has been resorted to since they can have various configurations of line geometry. However, such flexible etchings are expensive because of the necessity of preparing art work in laying out the circuit paths and because of the use of a laminate which involves 100% copper, a large portion of which must be etched away in preparing etchings.

This invention makes it possible to use a much more economical material, in other words, flat conductor cable to replace both the round wire jumper cable and flexible wire etching.

Accordingly, it is an object of this invention to provide a flat conductor cable jumper which is of substantially less width than the flat conductor cable of which it is made and which can be used to replace other types of jumpers which have been employed.

Briefly, the invention of this application involves forming a longitudinal slit between two conductors, preferably the middle two conductors of a flat conductor cable. Then by the use of two 45 degree folds, the ends of the flat conductor cable are formed so that they lie in the plane of the flat conductor cable but are disposed at a 90 degree angle to the longitudinal axis to the body portion of the flat conductor cable. In order that the conductors adjacent the outer ends of the flat conductor cables be exposed for interconnections to modules or other conductors, the insulation is stripped from conductors and a connector may be employed to assist in providing the interconnection.

Other objects and features of this invention will become more apparent in the discussion which follows below. The mechanical elements and configuration of the device of this invention is thoroughly described below in connection with the drawings in which:

FIG. 1 is a plan view of the device of this invention;
FIG. 2 is an end view of the device of this invention;
FIG. 3 is a plan view of the flat conductor cable employed as a major element in the device of this invention;
FIG. 4 is a side view of the flat conductor cable of FIG. 3, folded in accordance with the principles of this invention;
FIG. 5 is a plan view of the blade of the connector employed with the device of this invention;
FIG. 6 is a plan view of the shell member of the connector illustrated in FIG. 1 employed with the device of this invention;
FIG. 7 is a view of one of the end portions of the shell member of the connector;
FIG. 8 is a view of the opposite end portion of the shell member of the connector; and
FIG. 9 is a vertical section view of the shell member of the connector taken along the line 9—9 in FIG. 6.

The connector employed with the device of this invention, illustrated in FIG. 1 and referred generally as element 10 forms no part of this invention. For the details of construction and application of the connector 10 to the device of this invention, reference is made to U.S. application Serial No. 225,301, filed August 21, 1962 and entitled "Connector For Fat Conductor Cable." In that application the elements of the connector are thoroughly described and explained. The only purpose of including the connector 10 in the drawings of this invention is in order to show a complete device constituting a jumper. It is of course quite possible to use the device of this invention without any connector 10 but it is preferable to employ connectors since a much better connection can be effected thereby.

The flat conductor cable 12 illustrated in the figures is of the type wherein a plurality of parallel flat conductors are embedded or encased in a flat sheet or sheath of flexible plastic. The conductors 14 extend parallel to one another in a common plane and provide for an inexpensive way to prepare cable compared with previously used cables.

In the aforementioned patent application, reference is made to the use of flat conductor cable as a jumper wherein the width of the cable always remains the same. The fact that the cable 12 is flexible permits it to be bent in many configurations, but since it has a basic width, such bending occupies a considerable amount of space. It has been found that the amount of space occupied by the width of the jumper so formed prevented the jumper from achieving its full potential. Accordingly, in order to provide a jumper whose width is substantially less than that of prior art jumpers, the device of this invention was prepared.

Referring now to FIG. 3 it can be seen that in the flat conductor cable 12, a portion of the conductors adjacent the ends of the cable have been stripped of their insulation. At least one slit 16 is formed through the insulation intermediate to the ends of cable 12. The slit which extends along the length of a portion of the cable divides the cable into strips. The slit is formed through the insulation in such a manner as not to disturb any of the conductors or to expose any of the center portions of the conductors by stripping away their insulation. The distance between the ends of the slits 16 and the exposed conductors will depend upon the length of the respective ends of the jumper desirable. The length of the jumper depends upon the particular use to which it is to be put. In this way, the slit divides the cable into a plurality of strips which can then be folded to reduce the width of the cable.

Following the formation of one or more of the slits and in order to reduce the width of the flat conductor cable, the folds 15 and 17 illustrated in FIGS. 1 and 4 are formed in the cable itself. One end of the cable has two parallel 45 degree angle folds 15 formed in portions of the flat cable on either side of the slit. These folds have two purposes. The first purpose is to position the end of the flat cable conductor so that it lies in the plane of the remaining portion of the flat conductor cable and is positioned with the exposed conductors uppermost. In order to accomplish this, it is necessary that the opposite ends of the flat conductor cable have their folds formed in opposite directions. In other words, the right end of the conductor cable 12 as it appears in FIGS. 1 and 4 has two 45 degree folds 17 formed therein in such a way that the folds lie underneath the full width of the end of the flat cable and that the right end is square. If it is desirable to have the exposed conductors both facing upwardly, then there is formed a transverse fold 19 so that the cable is folded back over the two transverse 45 degree angle folds 17 along the line parallel with the slit. The result is that the exposed conductors are uppermost. The left-hand end need only have the two transverse folds 15 formed in it which are at 45 degree angles with the result that, as seen in the drawings, the left upper end of the member so formed is not square. Again, however, the folds lie under the upper portion of the flat conductor cables.

In folding the strips resulting from the slitting of the cable it is necessary to fold each of the strips about foldlines which are disposed at a common angle to the longitudinal axis with a corresponding portion of each of the foldlines disposed along a common line extending across the cable. In this manner it is insured that after folding, each of the strips are in an overlying position with respect to one another and contiguous thereto. Where the cable has been slitted along an intermediate portion thereof in forming a cable jumper or the like with the intermediate portion being folded at two locations, it is necessary that the foldlines at each of the locations about which the strips are to be folded be disposed at a common angle to the longitudinal axis of the cable and that each of the foldlines have a corresponding portion disposed along a common line extending at a right angle to the longitudinal axis of the cable. With this arrangement the strips can be brought together in a contiguous arrangement by the folding operation. In addition the direction of folding of the strips at each of the locations must be opposite to one another in order to bring the strips into the contiguous relationship. A jumper formed in this manner has its end portions extending in opposite directions with respect to the intermediate portion thereof. Where the jumper is to be of a substantially U-shaped form it is necessary to provide an additional fold in the cable in order to cause the end portions to end away from one side of the intermediate portion.

The connector 10 of the type described in the aforementioned application are attached to the ends of the flat conductor cable 12 in such a manner that the shell member or shell 18 illustrated in FIG. 6 contains the exposed conductors folded around the lower end 21 of the blade member or blade 20 illustrated in FIG. 5. In actual practice the exposed conductors 14 are bent around the end 21 of the blade 20 illustrated in FIG. 5 and are then inserted through the opening 22 illustrated in FIGS. 7 and 8 of the shell 18 illustrated in FIG. 6. The tabs 24 are raised in order to engage the projective shoulders 26 of the blade 20 illustrated in FIG. 5, thereby locking the end of the flat conductor cable with its conductors exposed inside of the connector. The upper portion 28 of the blade provides some additional rigidity to the flexible conductor and the finger hole 30 in the blade of the element illustrated in FIG. 5 facilitates withdrawal of the jumper from its module into which it is interconnected.

With the attachment of the connectors to the ends of the flat conductor cable 12, the jumper device of this invention is complete. As has been stated above, it is not necessary to use the connectors of the type illustrated in FIGS. 5–9 and illustrated as being attached in FIGS. 1 and 2. However, they are preferable since they permit the formation of a much more satisfactory device. Rubber bands 32 are attached at the points illustrated in FIG. 1 in order to bind together the blade 20 illustrated in FIG. 5 to the flat conductor cable and to keep those two elements together.

As can be seen from the drawings, the device of this invention permits a flat conductor cable to be employed in applications where it could not be employed before because of space considerations. The reduction in width of the flat conductor cable formed into the jumper of this invention permits a great saving of space and permits greater utility of the flat conductor cable jumper of this invention.

What is claimed:

1. A cable comprising a plurality of conductors extending parallel to one another in a common plane and a flat sheath of insulating material encasing said conductors, said sheath having at least one slit therein extending along the length of a portion of said cable between adjacent conductors of said plurality, said slit terminating before the end portions of said cable and dividing said portion of said cable into a plurality of strips, each of said strips being folded at an angle to the longitudinal axis of said cable and extending from adjacent a common edge portion thereof substantially in said common plane, whereby said portion of said cable extends away from the longitudinal axis of said cable substantially in said common plane.

2. A cable comprising a plurality of conductors extending parallel to one another in a common plane and a flat sheath of insulating material encasing said conductors, said sheath having at least one slit therein extending along the length of a portion of said cable between adjacent conductors of said plurality, said slit dividing said portion of said cable into plurality of strips, each of said strips being about a foldline extending at an angle of about 45 degrees to the longitudinal axis of said cable, said foldline of each of said strips having a portion disposed along the length thereof corresponding to a like portion of said foldline of each of the remainder of said plurality of strips, said corresponding portion of each of said foldlines being disposed along a common line extending at an angle of about 90 degrees to said longitudinal axis, each of said strips being folded into position substantially overlying one another and disposed substantially contiguous with said strip adjacent thereto, said cable being folded about an additional foldline extending across said cable at an angle of about 90 degrees to the longitudinal axis of said cable and adjacent said foldlines about which said strips are folded in order to change the relative position of said cable and said strips extending therefrom.

3. A jumper cable comprising a cable having a plurality of conductors extending parallel to one another in a common plane and a flat sheath of insulating material encasing said conductors, said cable having end portions each being adapted to be connected to at least one electrical circuit, and an intermediate portion disposed between said end portions, said sheath having at least one slit therein extending along the length of said intermediate portion of said cable between adjacent conductors of said plurality, said slit dividing said intermediate portion of said cable into a plurality of strips, each of said plurality of strips being folded at two locations thereon about foldlines disposed at each of said locations and extending at a common angle to the longitudinal axis of said cable, said foldline of each of said strips having a portion disposed along the length thereof corresponding to a like portion of said foldline of each of the remainder of said plurality of strips, said corresponding portion of said foldlines at each of said locations being disposed along a common line extending at a right angle to the longitudinal axis of said cable, the direction of the folding of said strips at each of said locations being in a common direction and opposite to that at the other of said locations, whereby said end portions of said cable extend away from the longitudinal axis of said cable.

4. A jumper cable comprising a cable having a plurality of conductors extending parallel to one another in a common plane and a flat sheath of insulating material encasing said conductors, said cable having end portions each being adapted to be connected to at least one electrical circuit, and an intermediate portion disposed between said end portions, said sheath having at least one slit therein extending along the length of said intermediate portion of said cable between adjacent conductors of said plurality, said slit dividing said intermediate portion of said cable into plurality of strips, each of said plurality of strips being folded at two locations thereon about foldlines disposed at each of said locations and extending at a common angle to the longitudinal axis of said cable, said foldline of each of said strips having a portion disposed along the length thereof corresponding to a like portion of said foldline of each of the remainder of said plurality of strips, said corresponding portion of said foldlines at each of said locations being disposed along a common line extending at a right angle to the longitudinal axis of said cable, the direction of the folding of said strips at each of said locations being in a common direction and opposite to that at the other of said locations, each of said strips being folded substantially contiguous to the strip adjacent thereto, whereby said end portions of said cable extend away from the longitudinal axis of said cable.

5. A jumper cable comprising a cable having a plurality of conductors extending parallel to one another in a common plane and a flat sheath of insulating material encasing said conductors, said cable having end portions each being adapted to be connected to at least one electrical circuit, and an intermediate portion disposed between said end portions, said sheath having at least one slit therein extending along the length of said intermediate portion of said cable between adjacent conductors of said plurality, said slit dividing said intermediate portion of said cable into a plurality of strips, each of said plurality of strips being folded at two locations thereon about foldlines disposed at each of said locations and extending at a common angle to the longitudinal axis of said cable, said foldline of each of said strips having a portion disposed along the length thereof corresponding to a like portion of said foldline of each of the remainder of said plurality of strips, said corresponding portion of said foldlines at each of said locations being disposed along a common line extending at a right angle to the longitudinal axis of said cable, the direction of the folding of said strips at each of said locations being in a common direction and opposite to that at the other of said locations, one of said end portions being additionally folded about a foldline extending across said end portion, whereby said end portions of said cable extend in opposite directions from said intermediate portion.

6. A jumper cable comprising a cable having a plurality of conductors extending parallel to one another in a common plane and a flat sheath of insulating material encasing said conductors, said cable having end portions each being adapted to be connected to at least one electrical circuit, and an intermediate portion disposed between said end portions, said sheath having at least one slit therein extending along the length of said intermediate portion of said cable between adjacent conductors of said plurality, said slit dividing said intermediate portion of said cable into a plurality of strips, each of said plurality of strips being folded at two locations thereon about foldlines disposed at each of said locations and extending at an angle of about 45 degrees to the longitudinal axis of said cable, said foldline of each of said strips having a portion disposed along the length thereof corresponding to a like portion of said foldline of each of the remainder of said plurality of strips, said corresponding portion of said foldlines at each of said locations being disposed along a common line extending at a right angle to the longitudinal axis of said cable, the direction of the folding of said strips at each of said locations being in a common direction and opposite to that at the other of said locations, whereby said end portions of said cable extend away from the longitudinal axis of said cable.

7. In a jumper cable including a length of flat conductor cable having a plurality of parallel insulating conductors, a portion of said cable near each end thereof being stripped of insulation, the combination comprising a longitudinally disposed slit formed through said cable between two of its said conductors, said slit having a length which is substantially less than the length of said cable and positioned intermediate the ends of said cable, two folds formed at a 45 degree angle to a line which is parallel to the longitudinal axis of said cable, said ends of said cable being extended at right angles to the longitudinal axis of said cable and the portions of said cable on either side of said strip being positioned in a facing relationship to the other, whereby the width of said cable is reduced.

8. In a jumper cable including a length of flat conductor cable having a plurality of parallel insulating conductors, a portion of said conductor near each end of said cable being stripped of insulation, and a connector attached to each end of said cable having said stripped portions exposed for interconnection to other means, the combination comprising a longitudinally disposed slit formed through the cable between two of said conductors, said slit having a length which is substantially less than the length of said cable and positioned intermediate said ends of said cable, the two portions of said cable on either side of said slit having 45 degree parallel folds formed therein, whereby the ends of said cable are disposed at a 90 degree angle to the longitudinal axis of said flat cable in a plane substantially parallel to said flat cable conductor and the width of said flat cable conductor is reduced by the positioning of said portions on either side of said slit in a facing relationship with each other.

9. In a jumper member including a length of flat conductor cable having a plurality of parallel insulating conductors, a portion of said conductor near each end of said cable being stripped of insulation, and a connector attached to each end of said cable having said stripped portions exposed for interconnection to other means, the combination comprising a longitudinally disposed slit formed through the cable between two of said conductors, said slit having a length which is substantially less than the length of said cable and positioned intermediate said ends of said cable, the two portions of said cable on either side of said slit having 45 degree parallel folds formed therein, an additional transverse fold formed therein at a 90 degree angle to said longitudinal axis, whereby the stripped ends of said cable are positioned on the same side of said jumper at a 90 degree angle to the longitudinal axis of said flat cable and in a plane substantially parallel to said flat cable, while the width of said flat cable is reduced by the positioning of said portions on either side of said slit in a facing relationship with one another.

References Cited by the Examiner

UNITED STATES PATENTS

| 890,988 | 2/1907 | Kitsee | 174—117 |
| 2,879,320 | 3/1959 | Staley et al. | 174—117 |

FOREIGN PATENTS

| 235,072 | 6/1925 | Great Britain. |

OTHER REFERENCES

International Resistance Company, Polystrip and Lamoflex Design Data (pp. 6, 15 and Connector Information).

LEWIS H. MYERS, *Primary Examiner.*

ROBERT K. SCHAEFFER, *Examiner.*

H. HUBERFELD, *Assistant Examiner.*